June 11, 1957 C. K. RAYNSFORD 2,795,695

INFORMATION PROCESSING APPARATUS

Filed Feb. 9, 1953 3 Sheets-Sheet 1

INVENTOR.
CHARLES KIMBALL RAYNSFORD
BY Theodore C Jay Jr
AGENT

INVENTOR.
CHARLES KIMBALL RAYNSFORD
BY Theodore C Jay Jr
AGENT

June 11, 1957 C. K. RAYNSFORD 2,795,695

INFORMATION PROCESSING APPARATUS

Filed Feb. 9, 1953 3 Sheets-Sheet 3

INVENTOR.
CHARLES KIMBALL RAYNSFORD
BY Theodore C Jay Jr
AGENT

Patented June 11, 1957

2,795,695

INFORMATION PROCESSING APPARATUS

Charles Kimball Raynsford, Summit, N. J., assignor to Vitro Corporation of America, Verona, N. J.

Application February 9, 1953, Serial No. 335,695
15 Claims. (Cl. 250—27)

My invention relates generally to information handling systems wherein information in the form of electrical impulse trains is stored, transferred and processed, and more particularly relates to information processing apparatus for use in such systems.

The prior art has knowledge of information processing devices which derive from a plurality of incoming impulse trains a resultant impulse train which represents a predetermined function of these incoming trains. Devices of this type require that each train represent information by a series of impulses which are present and absent in a coded arrangement which identifies the presented information. Each of these trains must be generated at a constant recurrence frequency and phase displacement with respect to the other trains; otherwise, corresponding portions of each incoming impulse train will not arrive at the imput of the device at the same instant, and the device would produce a meaningless result. Thus, these known devices cannot respond to incoming impulse trains which represent information not by a coded arrangement of impulses, but rather by variations in the recurrence frequency or the phase displacement of one train with respect to the other trains.

I have invented information processing apparatus which, in contradistinction to prior art devices, will respond to a plurality of incoming impulse trains having variable recurrence frequencies or phase displacements to derive therefrom a resultant impulse train which is a predetermined function of these incoming trains.

Accordingly, it is an object of the present invention to provide novel information processing apparatus of the character indicated.

It is the further object to provide information processing apparatus which will produce a meaningful result when the phase displacements or recurrence frequencies of incoming impulse trains vary.

Yet another object is to provide apparatus of the type described which will compare a plurality of incoming impulse trains as to their instantaneous frequency or instantaneous phase displacement to produce a resultant train which represents a predetermined function thereof.

Still another object is to provide apparatus of the type described which will compare two incoming impulse trains as to their instantaneous frequencies or instantaneous phase displacements to produce a resultant train which represents the instantaneous difference therebetween.

A further object is to provide apparatus of the type described which is highly sensitive to small differences in the phase displacements or recurrence frequencies of the incoming trains.

It is a specific object to provide a novel single stage impulse frequency comparator.

Another specific object is to provide a novel multistage impulse frequency comparator.

Still another specific object is to provide a novel impulse phase comparator.

Yet a further specific object is to provide a novel impulse frequency filter.

A further specific object is to provide apparatus of the type described which will function as an error generator in the impulse data servo systems.

Yet another specific object is to provide apparatus of the type described which will function as a beat frequency impulse generator.

A further specific object is to provide apparatus of the character indicated which will measure the randomness of a random impulse train.

These and other objects of the invention will become apparent when this specification is read in conjunction with the accompanying drawings wherein.

Briefly stated, my invention comprises at least one electric device which is characterized by a plurality of mutually exclusive electric states, and which has one or more input circuits and an output circuit and at least one conditionally responsive signal transfer network coupled to the output circuit and conditioned for operation when the device is in a selected electric state. The input of the network may be coupled to one of the input circuits. In a preferred embodiment of the invention, the electric device is a multivibrator and the conditionally responsive networks are gating circuits.

Figure 1:
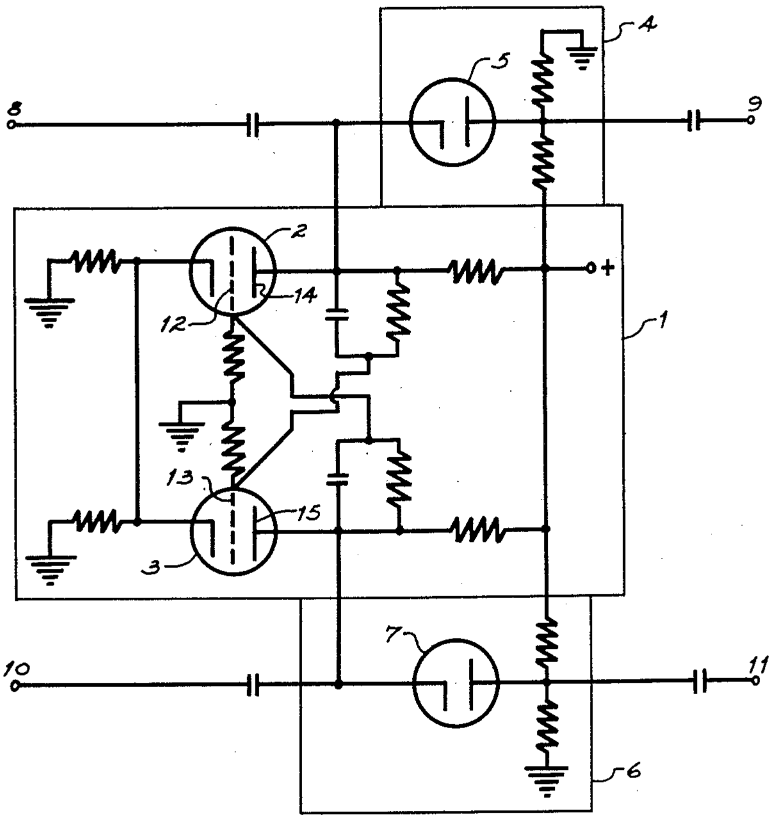
Fig. 1 is a schematic drawing of an impulse frequency comparator.

Referring now to Fig. 1, an electric discharge device characterized by two mutually exclusive electric states is generally identified at 1. This device may comprise a relay, a gas-filled electric discharge valve, a magnetic storage device having a substantially square hysteresis loop and the like. In this example, the device is a multivibrator which includes electric valve means 2 and 3. This multivibrator may be one of a number of widely known variants of the Eccles-Jordan trigger circuit which has two conditions of stable equilibrium; the first condition being that in which valve 2 is conducting current and valve 3 is cut-off, the second condition being that in which valve 3 is conducting and valve 2 is cut-off.

Assuming that the multivibrator is in the first equilibrium condition, a negative going impulse applied to the grid of valve 2 will cut-off valve 2, creating a positive going pulse at the anode 14 of valve 2. This positive impulse is transmitted through a direct coupling from the anode 14 to the grid 13 of valve 3, causing valve 3 to conduct current. The multivibrator is then in the second equilibrium condition. Any additional negative going impulses applied to the grid 12 of valve 2 will not change the equilibrium so long as the multivibrator remains in the first condition. However, when a negative going impulse is applied to the grid 13 of valve 3, valve 3 is cut-off, and a positive going impulse is supplied from the anode 15 of valve 3 to the grid of the valve 2, causing valve 2 to conduct current. The multivibrator is then in the first condition. Any additional negative going impulses applied to the grid of valve 3 will not change the multivibrator equilibrium as long as the multivibrator remains in the second condition.

A first conditionally responsive signal transfer network is generally identified at 4. The purpose of this network is to transfer to its output any signal appearing at its input when the device 1 is in a selected one of said electric states and to prevent such transfer when the device is in the other electric state. The first network may comprise first gating circuit means which includes a diode 5. Incoming negative impulses from a first variable frequency source (not shown) are applied at channel 8 and are transmitted both to the cathode of diode 5 and to grid 13. The cathode of diode 5 is also connected to the anode 14; the anode of diode 5 is connected to a point of positive potential. If the multivibrator is in the first condition of equilibrium, the valve 2 is conducting and the cathode potential of diode 5 is lower than its anode potential. Consequently, any impulses applied at channel 8 are transmitted through diode 5 and appear in conductor 9. If the multivibrator is in the second equilibrium condition, valve 2 is cut-off and the cathode potential of diode 5 so exceeds its anode potential that impulses applied at channel 8 will not be transmitted through diode 5. In the following description, conditionally responsive signal transfer networks or gates will be referred to as open or closed depending upon whether they transmit or block impulses impressed on their inputs.

A second conditionally responsive signal transfer network may, for example, comprise second gating circuit means 6 which includes a diode 7. Incoming negative impulses from a second variable frequency source (not shown) are applied at channel 10 and are transmitted both to the cathode of diode 7 and the grid 12. The cathode of diode 7 is also connected to the anode 15; and anode of diode 7 is connected to a point of positive potential. Diode 7 functions in the same manner as diode 5. If the multivibrator is in the first equilibrium condition, valve 2 is conducting the cathode potential of diode 7 exceeds that of its anode, and impulses applied at channel 10 will not be transmitted through diode 7. If the multivibrator is in the second condition, the cathode potential of diode 7 is lower than that of its anode, and any impulses applied at channel 10 are transmitted through diode 7 and appear on the conductor 11.

It will be apparent that if the first and second sources emit impulses at the same frequency, the multivibrator will be switched alternately from one equilibrium condition to the other and no impulses will appear on conductors 9 and 11. Should the frequency of the first source exceed that of the second source, impulses representing the frequency difference will appear on conductor 9. Similarly, if the frequency of the second source exceeds that of the first source, impulses representing the frequency difference will appear on channel 11.

Thus, only that number of impulses in excess of one produced in either channel during intervals between impulses in the other channel become output impulses.

If the signal sources produce impulses at different regularly spaced intervals, the impulse difference frequency will appear at one of the output conductors. In this situation, the apparatus shown in Fig. 1 is a pulse modulator and may be used, for example, in beat frequency impulse generators or as the error generator in impulse data servo systems.

Moreover, when the signals produced by both sources are generated at random, irrespective of the average generating frequency of both sources, there exists a finite probability that a sufficient number of impulses will occur in the lower frequency channel during the intervals in the higher frequency channel to cause an occasional output. For random inputs, therefore, neither channel can be absolutely zero, although the difference property is maintained; i. e., the difference between total number of impulses applied to channels 8 and 10 is equal to the difference between total number of impulses appearing at conductors 9 and 10. Moreover, the ratio of the total number of impulses appearing at any output conductor to that of the total number of impulses appearing on the corresponding input channel is always less than one, the ratio decreasing as the randomness of the incoming signal applied ot this input channel decreases with respect to the randomness of the other incoming signals. Thus this device provides a means of determining small frequency differences between incoming high frequency signals by reducing the absolute frequency of the incoming signals while maintaining the same frequency difference. By using several of these devices in a multistage arrangement it is possible to progressively decrease the absolute frequency of the incoming signals to any desired values while maintaining the same frequency difference. Consequently, far greater accuracy is obtained in determining the frequency difference information obtainable from incoming random signals.

In addition, when two impulse trains of the same mean frequency are supplied to this device, the impulses in one train being regularly spaced while the impulses in the other train are spaced at random, the total impulse output at each conductor will be approximately equal to $$\frac{1}{e}$$

times the total impulse input to the corresponding channel ("$e$" representing the natural logarithmic base). Since two regularly spaced impulse trains of the same frequency will result in zero output, intermediate outputs falling between 0 and $$\frac{1}{e}$$

times the corresponding input provide a measure of the randomness of the random impulse train.

Many different types of multivibrators and gating circuits responsive to positive as well as negative incoming impulses may be readily used in this device, and it is not intended to restrict the invention to the circuitry herein specifically disclosed.

Figure 2:
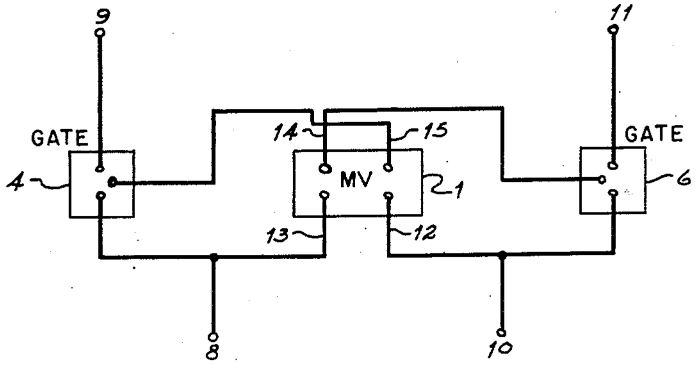
Fig. 2 is a block diagram of the apparatus shown in Fig. 1.

Fig. 2 is a block diagram of the apparatus shown in Fig. 1 wherein corresponding elements are identified by the same numbers. However, the gating circuits are so chosen that they pass signals whenever the tube coupled to the corresponding gate input is non-conductive. In this instance, the anode 15 is coupled to the gate 4 while the anode 14 is coupled to the gate 6, as clearly indicated in Figure 2. In other words, gate 4 is open when anode 15 is at high potential and is closed when anode 15 is at low potential. Gate 6 and anode 14 operate in a similar fashion. Thus, assume multivibrator 1 is in the first condition; then gate 4 is open and gate 6 is closed. All impulses supplied to gate 4 through channel 8 during the interval when no impulses are supplied to channel 10 pass through gate 4 to conductor 9. As soon as an impulse is supplied to channel 10, however, the multivibrator is urged into a second conductive condition, closing gate 4 and opening gate 6. All impulses then supplied to channel 10 during the interval when no impulses are supplied to channel 8 pass through gate 6 to conductor 11.

It is equally possible, however, to design these gates so that one gate is opened when its anode is at high potential while the other gate is open when its anode is at low potential. In this case, both gates will be controlled from the same anode. Moreover, these gates may be operated from other tube electrodes; for example, the cathodes or the screen grids.

It has been previously been shown in the discussion of Fig. 1 above that each stage reduces the absolute frequencies of two incoming signals while maintaining the same frequency difference. The overall reduction in these absolute frequencies is greatly augmented by the use of additional stages in a multistage arrangement.

Figure 3:
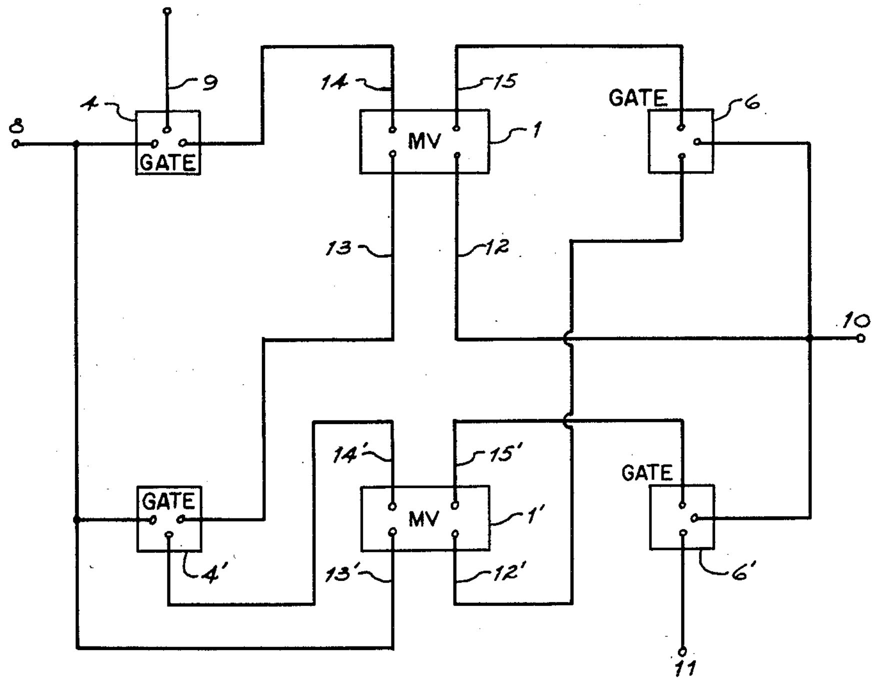
Fig. 3 is a block diagram of a multistage arrangement of the apparatus shown in Fig. 1.

Fig. 3 shows in block form a multistage arrangement of this type. This multistage apparatus comprises 2 multivibrators, 1 and 1', a first pair of gates, 4 and 4', and a second pair of gates, 6 and 6'.

Assume that initially both multivibrators are in the first conductive condition; i. e., anodes 14 and 14' are at low potential and anodes 15 and 15' are at high potential. The arrangement shown in Fig. 1 is used so that while both multivibrators remain in this condition (no impulses are supplied to channel 8), gates 4 and 4' are open and gates 6 and 6' are closed, and all impulses appearing at channel 8 are passed through gate 4 to conductor 9. When a first impulse appears on channel 10, multivibrator 1 is urged into the second conductive condition; anodes 14' and 15 are at low potential and anodes 14 and 15' are at high potential. Gates 4' and 6 are open and gates 4 and 6' are closed. (At this point if an impulse appears at channel 10, it cannot pass through gate 6'). When a second impulse appears on channel 10 prior to an impulse on channel 8, multivibrator 1' is urged into the second conductive condition, consequently gates 6 and 6' are open and gates 4 and 4' are closed. All further impulses appearing at channel 10 while both multivibrators are in the second condition, pass through gate 6' to conductor 11.

Thus, only that number of impulses in excess of two produced in either channel during intervals between impulses on the other channel become output impulses. Additional stages of the type shown in Fig. 2 may be added to this multistage apparatus as desired. Consequently, in general only that number of impulses in excess of N (where N represents the number of stages) produced in either channel during intervals between impulses in the other channel become output impulses.

Figure 4:
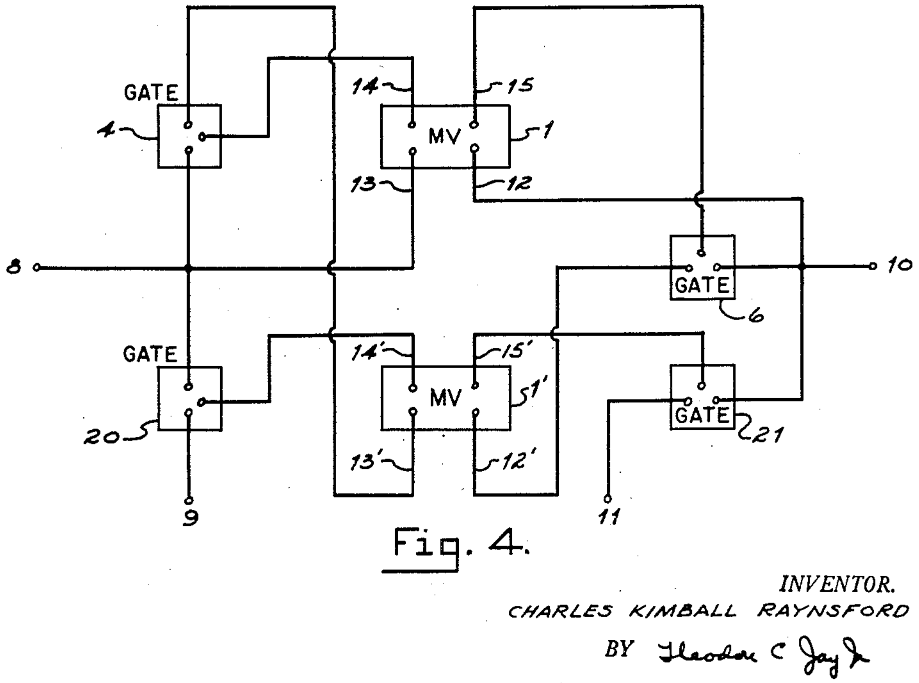
Fig. 4 is a block diagram of an impulse frequency filter.

Fig. 4 is a block diagram of an impulse frequency filter which comprises bi-stable multivibrators 1 and 1' and gates 4, 6 and 20. Incoming impulses from a first variable frequency source (not shown) are supplied through channel 8 to an input 13 of multivibrator 1 and to the inputs of gates 4 and 20. The output of gate 4 is connected to the input 13' of multivibrator 1'. The output of gate 20 is connected to output conductor 9. Gates 4 and 20 are controlled from multivibrator outputs 14 and 14' respectively, these gates being opened when these outputs are at low potential and being closed when these outputs are at high potential.

Incoming impulses from a second variable frequency source (not shown) are supplied through channel 10 to an input 12 of multivibrator 1 and to the input of gate 6. The output of gate 6 is connected to the input 12' of multivibrator 1'. Gate 6 is controlled from multivibrator output 15, this gate being opened when this output is at low potential and being closed when this output is at high potential.

If two or more impulses appear on channel 8 during an interval when no impulses appear on channel 10, the first impulse on channel 8 urges the multivibrator 1 to the first conductive condition; gate 4 is opened and gate 6 is closed. The second impulse passes through gate 4 to multivibrator 1' and urges it into the first conductive condition, thus opening gate 20. All succeeding impulses appearing on channel 8 during this interval pass through gate 20 to conductor 9.

If an impulse now appears on channel 10, multivibrator 1 is urged into its second conductive condition, closing gate 4 and opening gate 6. If a second impulse appears on channel 10 (no intervening impulse appearing on channel 8), multivibrator 1' is urged into its second condition, closing gate 20 and preventing any impulses from passing therethrough. Should an intervening impulse appear on channel 8, multivibrator 1 will be urged into its first condition, and gate 20 will remain open.

Thus this device operates as a high pass filter, gate 20 passing all impulses from the first source as long as the frequency of the first source exceeds that of the second source, gate 20 being closed when the frequency of the second source exceeds that of the first source.

When gate 21 is inserted in this apparatus (see Fig. 4) and connected in such a way that the input of gate 21 is connected to channel 10 and the output is connected to output channel 11, and the gate is controlled from the output 15' of multivibrator 1', gate 21 acts in reverse sense to gate 20 and the apparatus operates as a high pass and a low pass filter concurrently. It is of course possible to arrange this apparatus in such a way that either gate 20 or 21 is eliminated. In these situations, the apparatus acts as a low pass or a high pass filter respectively.

Figure 5:
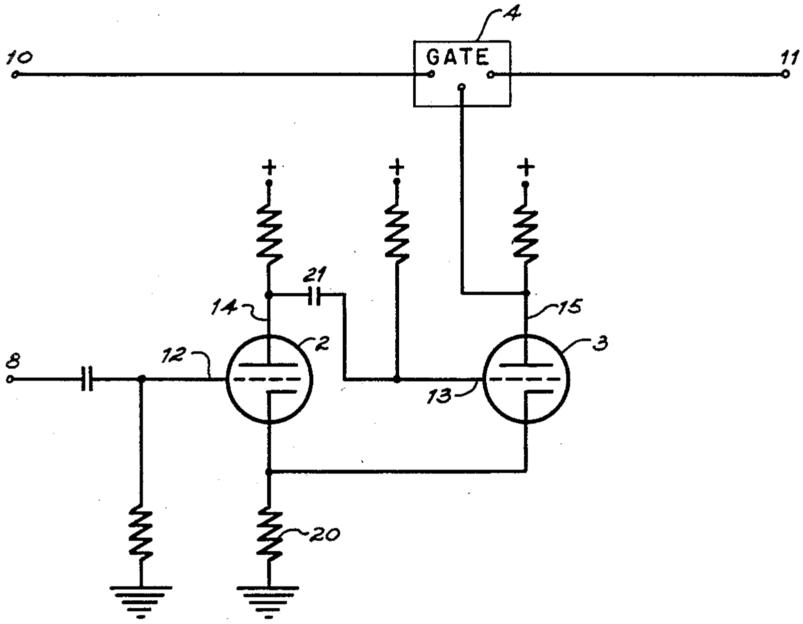
Fig. 5 is a schematic diagram of an impulse phase comparator.

Fig. 5 shows an impulse phase filter where a multivibrator is used which has two states of equilibrium, one of which is unstable. Such multivibrators, often called one-shot multivibrators, are widely known. The multivibrator herein used comprises electric discharge valves 2 and 3. In the stable condition of equilibrium, valve 3 is conducting and valve 2 is cut-off because of the voltage drop through cathode resistor 20. Incoming positive impulses from a first variable frequency source (not shown) appear at channel 8. Any such impulse renders valve 2 conductive; a consequent drop in plate voltage appearing at 14 is supplied through capacitator 21 and resistor 22 to the grid 13 as a negative pulse which normally renders valve 3 non-conductive. This condition is the unstable equilibrium condition.

Within a time interval as determined by the circuit parameters, capacitator 21 discharges sufficiently toward the lower value of plate voltage of valve 2 to allow grid 13 to rise form its lowest value to a point where valve 3 begins to conduct. At this point the current flow through the cathode resistor 20 increases due to the current flow through valve 3 and the resultant increase in voltage across the cathode resistor renders valve 2 nonconductive, thus returning the multivibrator to its stable equilibrium state.

Gate 4 is connected to the anode 15 and for a time interval C (less than A) is opened when the multivibrator is in the unstable state. When this gate is opened impulses appearing at channel 10 from a second variable frequency source (not shown) are supplied through the gate to conductor 11. Gate 4 is closed for the entire time interval that the multivibrator is in the stable state and is also closed for the time interval A—C when the multivibrator is in the unstable state.

The device operates in the following manner. An impulse from the first source urges the multivibrator into the unstable state. Gate 4 is opened for the time interval C. Any impulse from the second source appearing on channel 10 during time interval C is passed through the gate; any impulse appearing on channel 10 during the time interval A—C cannot pass through the gate. By proper selection of time intervals A and C, this device can be so designed that only those impulses from the second source which exhibit a predetermined maximum time or phase displacement with respect to the corresponding impulses from the first source pass through the gate. By varying these time intervals and, if necessary, reversing the gating action, it is possible to design many other types of impulse phase filters which fall within the scope of the present invention.

While I have described the invention in the preferred forms shown, it will be understood that modifications may be made within the scope and sphere of the invention as defined in the claims which follow.

I claim:

1. In combination, a plurality of electric devices arranged in a predetermined sequence, each device being characterized by first and second mutually exclusive electric states and provided with first and second input circuits and an output circuit, and first and second circuit arrays, each array comprising a like plurality of conditionally responsive signal transfer networks, each network in said arrays being coupled to the output circuit of the corresponding device, each network in said first array being conditioned for operation when its corresponding device is in said first state, each network in said second array being conditioned for operation when its corresponding device is in said second state, the inputs of all networks in said first array being coupled to the first input circuit of the first device in said sequence, the inputs of all networks in said second array being coupled to the second input circuit of the last device in said sequence, each network in said first array except the network corresponding to said last device having its output coupled to the first input circuit of the device immediately succeeding its corresponding device in said sequence, each network in said second array except the network corresponding to said first device having its output coupled to the second input circuit of the device immediately preceding its corresponding device in said sequence.

2. In combination, first and second binary elements, each element being characterized by first and second mutually exclusive electric states and provided with first and second input circuits and an output circuit, and first, second, third, and fourth gates, the inputs of said first and second gates being coupled to the first input circuit of said second element, the inputs of said third and fourth gates being coupled to the second input circuit of said first element, the output of said second gate being coupled to the first input circuit of said first element, the output of said third gate being coupled to the second input circuit of said second element, said first and second gates being respectively coupled to the output circuits of said first and second elements and respectively conditioned for operation only when the corresponding element is in said first state, said third and fourth gates being respectively coupled to the output circuits of said first and second elements and respectively conditioned for operation only when the corresponding element is in said second state.

3. In combination, first and second binary elements, each element being characterized by first and second mutually exclusive electric states and provided with first and second input circuits and an output circuit, first and second gates, each coupled to the output circuit of said first device, said first gate being conditioned for operation when said first device is in said first state, said second gate being conditioned for operation when said device is in said second state, the inputs of said first and second gates being respectively coupled to the first and second input circuits of said first device, the outputs of said first and second gates being respectively coupled to the first and second input circuits of said second device, and a third gate coupled to the output circuit of said second device and conditioned for operation when said second device is in a selected one of said first and second states, the input of said third gate being coupled to a selected one of the first and second input circuits of said first device.

4. A device for deriving from first and second incoming impulse trains having variable recurrence frequencies, a third impulse train representing the instantaneous frequency difference therebetween, said device comprising a multivibrator characterized by set and restore electric states and provided with set and restore inputs and an output circuit; first and second gates, each gate being provided with input, output and conditioning connections, the input connections of said first and second gates being connected to the set and restore inputs respectively; means coupling the conditioning connections of said first and second gates to said output circuit to open said first gate and close said second gate when said multivibrator is in its set state, said gating action being reversed when said multivibrator is in its restore state; and means to supply said first and second trains to the set and restore inputs respectively whereby said third train appears at the output connection of said first gate when the frequency of said first train exceeds that of said second train and appears at the output connection of said second gate when the frequency of said second train exceeds that of said first train.

5. A device for deriving from first and second impulse trains of variable recurrence frequency, the frequency of said first train always being larger than that of said second train, a third impulse train representing the instantaneous frequency difference between said first and second trains, said device comprising a multivibrator characterized by set and restore electric states and provided with set and restore inputs and an output circuit; a gate provided with input, output and conditioning connections, said input connection being coupled to said set input, said conditioning connection being coupled to the output circuit in a connection at which said gate is opened only when said multivibrator is in its set state; and means to supply said first and second trains to the set and restore inputs respectively whereby said third train appears at said output connection.

6. A device for deriving from first and second impulse trains of variable recurrence frequency, the frequency of said first train always being smaller than that of said second train, a third impulse train representing the instantaneous frequency difference between said first and second trains, said device comprising a multivibrator characterized by set and restore electric states and provided with set and restore inputs and an output circuit; a gate provided with input, output and conditioning connections, said input connection being coupled to said restore input, said conditioning connection being coupled to the output circuit in a connection at which said gate is opened only when said multivibrator is in its restore state; and means to supply said first and second trains to the set and restore inputs respectively whereby said third train appears at said output connection.

7. A high pass filter comprising first and second multivibrators, each multivibrator being characterized by set and restore electric states and provided with set and restore inputs and an output circuit; first, second and third gates, each gate being provided with input, output and conditioning connections, the input connections of said first and second gates being coupled to the set input of said first multivibrator, the input connection of said third gate being coupled to the restore input of said first multivibrator, the output connection of said first gate being coupled to the set input of said second multivibrator, the output connection of said third gate being connected to the restore input of said second multivibrator; means coupling the conditioning connections of said first and third gates to the output circuit of said first multivibrator to open said first gate and close said third gate when said first multivibrator is in its set state, said gating action being reversed when said first multivibrator is in its restore state; means coupling the conditioning connection of said second gate to the output circuit of said second multivibrator to open said second gate only when said second multivibrator is in its set state; and means to supply first and second impulse trains of variable recurrence frequency to the set and restore inputs respectively of said first multivibrator whereby said first train appears at the output connection of said second gate only when the instantaneous frequency of said first train exceeds that of said second train.

8. A low pass filter comprising first and second multivibrators, each multivibrator being characterized by set and restore electric states and provided with set and restore inputs and an output circuit; first, second and third gates, each gate being provided with input, output and conditioning connections, the input connections of said first and second gates being coupled to the restore input of said first multivibrator, the input connection of said third gate being coupled to the set input of said first multivibrator, the output connection of said first gate being coupled to the restore input of said second multivibrator, the output connection of said third gate being connected to the set input of said second multivibrator; means coupling the conditioning connections of said first and third gates to the output circuit of said first multivibrator to open said first gate and close said third gate when said first multivibrator is in its restore state, said gating action being reversed when said first multivibrator is in its set state; means coupling the conditioning connection of said second gate to the output circuit of said second multivibrator to open said second gate only when said second multivibrator is in its restore state; and means to supply first and second impulse trains of variable recurrence frequency to the set and restore inputs respectively of said first multivibrator whereby said second train appears at the output connection of said second gate only when the instantaneous frequency of said second train is less than that of said first train.

9. A high-low pass filter comprising first and second multivibrators, each multivibrator being characterized by set and restore electric states and provided with set and restore inputs and an output circuit; first, second, third and fourth gates, each gate being provided with input, output and conditioning connections, the input connections of said first and second gates being coupled to the set input of said first multivibrator, the input connections of said third and fourth gates being coupled to the restore input of said first multivibrator, the output connection of said first gate being coupled to the set input of said second multivibrator, the output connection of said third gate being connected to the restore input of said second multivibrator; means coupling the conditioning connections of said first and third gates to the output circuit of said first multivibrator to open said first gate and close said third gate when said first multivibrator is in its set state, the gating action of said first and third gates being reversed when said first multivibrator is in its restore state; means coupling the conditioning connections of said second and fourth gates to the output circuit of said second multivibrator to open said second gate and close said fourth gate when said second multivibrator is in its set state, the gating action of said second and fourth gates being reversed when said second multivibrator is in its restore state; and means to supply first and second impulse trains of variable recurrence frequency to the set and restore inputs respectively of said first multivibrator whereby said first train appears at the output connection of said second gate and said second train appears at the output connection of said fourth gate only when the instantaneous frequency of said first train exceeds that of said second train.

10. In combination, first and second multivibrators, each multivibrator being characterized by set and restore electric states and provided with set and restore inputs and an output circuit; first, second, third and fourth gates, each gate being provided with input, output and conditioning connections; means coupling the input connections of said first and second gates to the set input of said second multivibrator; means coupling the input connections of said third and fourth gates to the reset input of said first multivibrator; means coupling the output connection of said second gate to the set input of said first multivibrator; means coupling the output connection of said fourth gate to the restore input of said second multivibrator; means coupling the conditioning connections of said first and third gates to the output circuit of said first multivibrator to open said first gate and close said third gate when said first multivibrator is in its set state, the gating action of said first and third gates being reversed when said first multivibrator is in its restore state; and means coupling the conditioning connections of said second and fourth gates to the output circuit of said second multivibrator to open said second gate and close said fourth gate when said second multivibrator is in its set state, the gating action of said second and fourth gates being reversed when said second multivibrator is in its restore state.

11. A pulse filter comprising a multivibrator characterized by a stable and an unstable electric state, said multivibrator when in said unstable state returning to the stable state after a first predetermined interval, said multivibrator having input and output circuits and being urged into the unstable state when a pulse of selected polarity is applied to said input circuit; a gate provided with input, output and conditioning connections; means coupling said conditioning connection to said output circuit to open said gate for a second predetermined interval which is smaller than said first interval only when said multivibrator attains one of said states; means to supply a first pulse train having said selected polarity to the input circuit of said multivibrator, said first train having a recurrence frequency related to said first interval in a condition at which said multivibrator automatically returns to said stable state after the reception of each pulse; and means to supply a second pulse train to the input connection of said gate, whereby only those pulses in said second train produced during said second interval appear at the output connection of said gate.

12. A filter as set forth in claim 11 wherein said gate is opened only when said multivibrator is in its unstable state.

13. Apparatus for deriving from first and second impulse trains of variable recurrence frequency, the frequency of said first train being larger than that of said second train, a third impulse train representing the instantaneous frequency difference between said first and second trains, said apparatus comprising an electrical device characterized by set and restore mutually exclusive electric states and provided with set and restore inputs and an output circuit; a gate provided with input, output, and conditioning connections, said input connection being coupled to said set input, said conditioning connection being coupled to the output circuit in a connection at which said gate is opened only when said device is in its set state; and means to supply said first and second trains to the set and restore inputs respectively whereby said third train appears at said gate output connection.

14. Apparatus for deriving from first and second impulse trains of variable recurrence frequency, the frequency of said first train being smaller than that of said second train, a third impulse train representing the instantaneous frequency difference between said first and second trains, said apparatus comprising an electrical device characterized by set and restore mutually exclusive electrical states and provided with set and restore inputs and an output circuit; a gate provided with input, output, and conditioning connections, said input connection being coupled to said restore input, said conditioning connection being coupled to the output circuit in a connection at which said gate is opened only when said device is in its restore state; and means to supply said first and second trains to the set and restore inputs respectively whereby said third train appears at said gate output connection.

15. A pulse filter comprising an electric device characterized by a stable and an unstable electric state, said device when in said unstable state returning to the stable state after a first predetermined interval, said device having input and output circuits and being urged into the unstable state when a pulse of selected polarity is applied to said input circuit; a gate provided with input, output and conditioning connections; means coupling said conditioning connection to said output circuit to open said gate for a second predetermined interval which is smaller than said first interval only when said device attains one of said states, means to supply a first pulse train having said selected polarity to the input circuit of said device, said first train having a recurrence frequency related to said first interval in a condition at which said device automatically returns to said stable state after the reception of each pulse; and means to supply a second pulse train to the input connection of said gate, whereby only those pulses in said second train produced during said second interval appear at the output connection of said gate.

References Cited in the file of this patent

UNITED STATES PATENTS

| | | |
|---|---|---|
| 2,428,990 | Rajchmann | Oct. 14, 1947 |
| 2,462,275 | Morton et al. | Feb. 22, 1949 |
| 2,568,750 | Krause et al. | Sept. 25, 1951 |
| 2,577,762 | Hoeppner et al. | Dec. 11, 1951 |
| 2,589,465 | Weiner | Mar. 18, 1952 |
| 2,628,309 | Hughes | Feb. 10, 1953 |
| 2,643,820 | William et al. | June 30, 1953 |